US010659235B1

(12) United States Patent
Brown

(10) Patent No.: US 10,659,235 B1
(45) Date of Patent: May 19, 2020

(54) DISTRIBUTED ENDPOINT AUTHENTICATION

(71) Applicant: Amazon Technologies, Inc., Seattle, WA (US)

(72) Inventor: Aaron Michael Brown, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 15/823,496

(22) Filed: Nov. 27, 2017

(51) Int. Cl.
*H04L 29/06* (2006.01)
*H04L 9/32* (2006.01)
*H04L 9/08* (2006.01)
*H04L 29/08* (2006.01)

(52) U.S. Cl.
CPC .......... *H04L 9/3263* (2013.01); *H04L 9/0825* (2013.01); *H04L 63/0236* (2013.01); *H04L 67/02* (2013.01); *H04L 67/18* (2013.01)

(58) Field of Classification Search
CPC .......................... H04L 9/0825; H04L 63/0236
USPC .......................................................... 713/156
See application file for complete search history.

(56) References Cited

U.S. PATENT DOCUMENTS 7,360,094 B2 * 4/2008 Neff ...................... H04L 9/0825
705/12

OTHER PUBLICATIONS

Polk, W., et al., "Algorithms and Identifiers for the Internet X.509 Public Key Infrastructure Certificate and Certificate Revocation List (CRL) Profile," Request for Comments: 3279, Standards Track, Apr. 2002, 26 pages.
Schaad, J., et al., "Additional Algorithms and Identifiers for RSA Cryptography for Use in the Internet X.509 Public Key Infrastructure Certificate and Certificate Revocation List (CRL) Profile," Request for Comments: 4055, Standards Track, Jun. 2005, 24 pages.
Leontiev, S., and D. Shefanovski, "Using the GOST R 34.10-94, GOST R 34.10-2001, and GOST R 34.11-94 Algorithms With the Internet X.509 Public Key Infrastructure Certificate and CRL Profile," Request for Comments: 4491, Standards Track, 19 pages.
Cooper, D., et al., "Internet X.509 Public Key Infrastructure Certificate and Certificate Revocation List (CRL) Profile," Request for Comments: 5280, Standards Track, 141 pages.

* cited by examiner

*Primary Examiner* — Longbit Chai
(74) *Attorney, Agent, or Firm* — Davis Wright Tremaine LLP

(57) ABSTRACT

A system sends a request for access to a resource and receives a digital certificate in response to the request. The system simultaneously causes one or more computing devices located in different geographical locations to send a plurality of requests to also access the resource. In response to the plurality of requests, digital certificates are received. The digital certificate is then compared to the plurality of digital certificates received from the plurality of requests sent by the computing devices in different geographical locations. The result of the comparison indicates whether the digital certificate is trustworthy.

20 Claims, 9 Drawing Sheets

DISTRIBUTED ENDPOINT AUTHENTICATION

BACKGROUND

Modern computer systems place a high importance on security of user access to computing resources. Specifically, the security of network communications is important to both network users and network service providers. One way that the security of network communications is enhanced is through the use of digital certificates. A digital certificate is an electronic document that can be used to prove the identity of the certificate owner by showing ownership of a public key. However, maintaining the security of digital certificates can be difficult and consume significant resources. For example, certificate authorities use robust verification processes to ensure that certificates are not issued in error. Nevertheless, an attacker may attempt to obtain a counterfeit digital certificate and impersonate another company, user, or entity. Accordingly, a client computing device that receives a digital certificate in response to a request to access a computing resource may also want to perform operations to ensure that the digital certificate is trustworthy.

BRIEF DESCRIPTION OF THE DRAWINGS

Various techniques will be described with reference to the drawings, in which.

DETAILED DESCRIPTION

Figure 1:
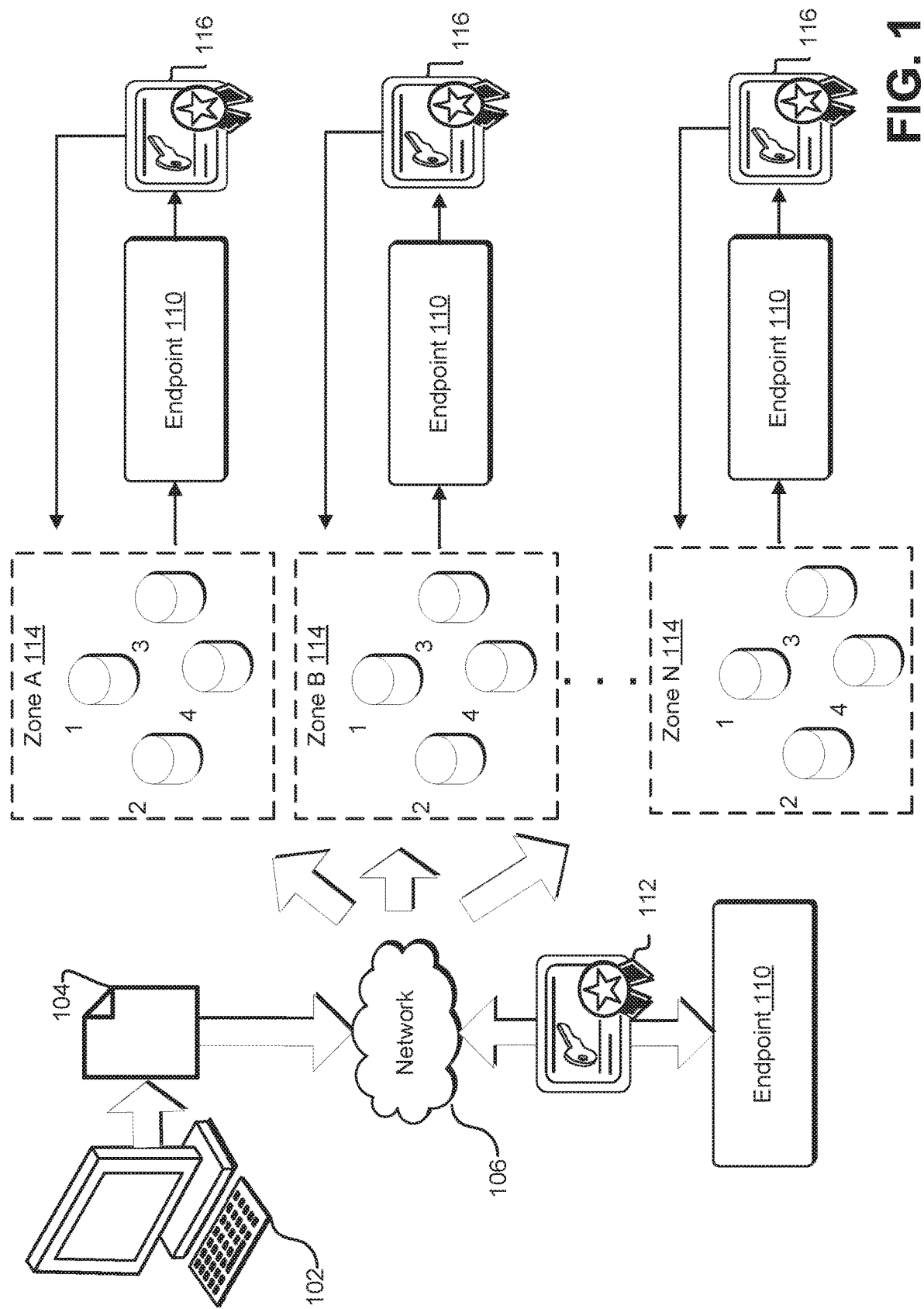
FIG. 1 illustrates a system in which one embodiment of comparing multiple digital certificates associated with a plurality of requests for access to a resource may be practiced.

The present document describes sending a request to access one or more computing resources and simultaneously causing one or more computing devices located in different geographical locations to send additional requests to access the one or more computing resources. A digital certificate is received in response to the request and digital certificates are received in response to the additional requests. The digital certificate and the plurality of digital certificates are compared with one another to determine whether the digital certificate, received in response to the request, is trustworthy. In other words, the comparison of digital certificates may provide information as to whether a digital certificate can be trusted.

In an example, a client computing device may generate and send a first request (e.g., HyperText Transfer Protocol Secure (HTTPS) connection request) to an endpoint for access to a resource (e.g., webpage, network host, etc.). Simultaneously, a plurality of requests to the same endpoint for access to the resource to be sent from a plurality of different locations may be triggered. That is, the client computing device may, on its own or through a proxy, cause the launch of a function (e.g., containerized script) so that additional computing devices located in different locations may send requests for access to the same resource. In response to the first request and the plurality of requests, digital certificates may be received. The information contained in the digital certificates may then be compared with one another to determine whether the digital certificate, received as a result of the first request, is deemed trustworthy. Once the determination has been made indicating that a digital certificate is trustworthy, access to the resource may then be provided.

Moreover, in an example, access to the resource depends on whether the plurality of digital certificates, containing identical information as the information in the digital certificate, meets a certain threshold number. For example, a client computing device (located in Los Angeles, Calif., USA) receives a first digital certificate in response to sending a first request for access to a resource. As a result of identifying that the first request was sent, additional requests are also sent from a plurality of different geographical locations in an attempt to access the same resource. That is, as an example, a second request for access to the resource is sent from a computing device (located in Tokyo, Japan), a third request for access to the resource is sent from a computing device (located in London, United Kingdom), and a fourth request for access to the resource is sent from a computing device (located in Vancouver, Canada). As a result of sending these additional requests, digital certificates are received.

Accordingly, the plurality of digital certificates received based on the additional requests are analyzed to determine if the information contained therein match the information contained in the first digital certificate. If they all match, a subsequent step, for example, may be to determine whether the number of plurality of digital certificates meet or exceed a threshold value. In an example, the predetermined threshold value may be set at three. So, if all three digital certificates obtained from the different locations (e.g., Tokyo, London, and Vancouver) match the first digital certificate received in Los Angeles, the system may then determine that the first digital certificate is trustworthy. If all three of the digital certificates do not each contain information that match the first digital certificate, access to the resource may be denied all together or, in the alternative, access to the resource may be provided with restrictions.

In yet another example, a client computing device may send a request for access to a resource and the response to the request may be a fingerprint or a public key. That is, the response to the request may not necessarily have to be a digital certificate and does not necessarily have to use all the information contained in a digital certificate. The response may be in any form containing information based at least in part on or associated with a digital certificate.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a system in which one embodiment of comparing multiple digital certificates associated with a plurality of requests for access to a resource may be practiced. In an embodiment, a client computing device 102 may submit a request (e.g., HTTPS connection request) 104 via a network 106 to an endpoint 110 for access to a resource. The client computing device 102 may be any appropriate electronic device operable to send and receive requests, messages, and or other such information over an appropriate network. That is, in an embodiment, a client computing device 102 may be a personal computer, a tablet computer, smart phone, a notebook computer, or the like. Moreover, the client computing device 102 may also be a virtual machine or an instance of a virtual machine operating within a computing resource service provider. The client computing device 102 may send requests and messages over network 106. As shown in FIG. 1, client computing device 102 is the sole device illustrated; however, there may be more than one client computing device implemented to send requests and messages to access computing resources at endpoint 110.

As shown in FIG. 1, network 106 is any appropriate network, such as the Internet, intranet, a cellular network, and/or any combination thereof. The network 106 may include one or more client computing devices, one or more servers, and/or clusters of servers interconnected with one another. The communication over the network 106 may be performed over a wired or wireless connection. In an embodiment, the client computing device 102 sends the request 104 over network 106, such as the Internet, via a wired or wireless connection.

Moreover, as depicted in FIG. 1, a digital certificate 112 may be provided in response to the request 104. Generally, a digital certificate 112 is an electronic document that can be used to prove the identity of the certificate owner by showing ownership of a public key. The digital certificate 112 may include a set of signature fields where the set of signature fields indicates a certificate signature algorithm and a certificate signature, which may be a digital signature generated based at least in part on data in the digital certificate 112 by a certificate authority. An indicator of a certificate signature algorithm in the set of signature fields indicates an algorithm used to generate the certificate signature. A more detailed description of what kind of information is included in a digital certificate 112 is further described with respect to FIG. 4 below.

Further describing FIG. 1, as an example, the request 104 is identified. As a result of the identification, a plurality of requests for access to the same endpoint representing the same resource may simultaneously be sent from a plurality of different locations (e.g., zones) 114. That is, via the network 106, additional requests may be launched by different computing devices located in different zones 114. For example, when request 104 is identified, parallel messages to a number of geographically distributed locations to launch a function (e.g., light-weight, containerized script) that requests the same endpoint 110 for the same resource are also made. That is, as an example, the client computing device 102 (located in Los Angeles, Calif., USA) receives a first digital certificate 112 in response to sending a first request 104 for access to a resource. As a result of identifying that the first request 104 was sent, the parallel messages include instructions that, when executed, cause additional requests to be sent simultaneously by a plurality of different locations (e.g., zones) 114 in an attempt to access the same resource via endpoint 110. That is, for example, an additional request for access to the resource is sent from a computing device of Zone A 114 (located in Tokyo, Japan) and another request for access to the resource is sent from a computing device of Zone B 114 (located in London, United Kingdom). In other words, messages (e.g., parallel requests) may be sent to Zone A and Zone B, where these messages include instructions to trigger code to be launched from both Zone A and Zone B to request additional digital certificates. As illustrated in FIG. 1, there may be N amount of zones available to choose from to send these additional requests for additional digital certificates.

In some instances, more than one computing device in each of the zones 114 may send the additional requests. For instance, Zone A 114 may utilize two computing devices of the four computing devices (as shown in FIG. 1) to send the additional requests. Zone A 114, in return, may then receive two digital certificates. Each of the zones 114 may contain a plurality of computing devices, virtual machines, and/or an instance of a virtual machine that, when executed, may be directed to send the additional requests.

As a result of sending the additional requests, a plurality of digital certificates 116 are provided. The client computing device 102 may obtain the digital certificates 116 in response to the additional requests and determine whether the information contained therein match the first digital certificate 112. That is, the information contained in each of the plurality of digital certificates 116 are analyzed and compared against the information contained in the digital certificate 112. The digital certificate 112 is deemed to be trustworthy if each of the plurality of digital certificates 116 contain information that are identical to the information contained in the digital certificate 112. For example, the comparison to determine if the digital certificates contain identical information can be performed by hashing each certificate and comparing the hashes, identifying fields contained in each certificate and comparing some or all of the fields. In another example, as described in more detail below with respect to FIG. 7, fingerprints from each certificate are compared to one another to determine if the digital certificates are identical. Based on the results of the determination, access to the resource may be provided.

In an example, the request 104 may run through a proxy (not depicted in FIG. 1 but described in more detail with respect to FIG. 6) that elicits or causes the additional computing devices from different zones 114 to send the plurality of additional requests. The proxy may be a separate device from the client computing device 102 or a service implemented by a server, a separate computing device, or a cluster of computing devices (not depicted in FIG. 1). In an example, the proxy service may be called upon as executable code, and if executed, to intercept requests from client computing devices. The proxy may then perform one or more actions, using the resources of the server, to the intercepted requests prior to connecting the client computing devices to a computing resource, other services, and/or websites. The client computing device 102 may run instructions or code using JAVA™, Python™, Node.js®, C++, Ruby, Hypertext Preprocessor (PHP), and/or other programming languages to connect to this proxy. In an embodiment, the request 104 from client computing device 102 is intended for endpoint 110. However, the software developer's kit (SDK) of the client computing device 102 may be modified such that the client computing device 102 believes that the proxy is the actual endpoint 110. In order to do this, the endpoint-to-Domain Name Servers (DNS) look up table associated with the client computing device 102 may be altered. The look up table may be altered in a way that it can be run either using JAVA™, Python™, Node.js®, C++, Ruby, PHP, and/or other programming languages.

In an embodiment, a function (also not depicted in FIG. 1 but described in more detail with respect to FIG. 6), may be triggered once the request 104 has been sent from the client computing device 102. The function may be executed at the client computing device 102 or in a separate computing device between the client computing device 102 and the endpoint 110. In an embodiment, the function may be "stateless," with no affinity to the underlying infrastructure. In other words, the function, when implemented or called upon, may not be sensitive to the state of the computation. In an embodiment, data passed through the function may generate and the produce the same data as output. Thus, the function may operate or be implemented simply to pass data or information without knowledge of the past, current, or future state changes. In an embodiment, more than one function may be made available and the one or more functions may be provided and scaled dynamically to process incoming requests. In an embodiment, the function may run code or instructions using an allocated resource instance.

That is, in an embodiment, when a request is sent, an associated function is triggered (e.g., code for the function is loaded and launched on the same client computing device or another computing device). The request may identify the function to launch with an identifier and parameters to be input to the function (e.g., which website or resource to request). The function may have code for completing the HTTPS request. Additionally, in some embodiments, the function may be cached so that it is ready to be executed when a request is sent. That may happen, for instance, when popular websites or sites are accessed from the same client computing device accesses frequently.

In an embodiment, the client computing device 102 may determine which of the zones 114 may be used to send additional requests. In other words, each of the zones 114 may first be identified before causing computing devices in zones 114 to send the additional requests. The determination as to which zones 114 to select may be made randomly or it may be predetermined. In order to ensure the integrity of each of these zones that send the additional requests, valid certificates can be provided out-of-band and pinned by the application (or client computing device 102) making the first request. This way, a local root of trust is formed to validate the endpoint 110 for access to the resource.

Once a zone (or multiple zones) has been identified, in some instances, a function (e.g., light-weight containerized script) for a computing device in each identified zone may be launched to request the same endpoint 110 for the same resource. In response to these requests from different zones, a plurality of digital certificates 116 may be returned. The plurality of digital certificates 116 may be returned back to the function and the function may forward the additional digital certificates 116 back to the client computing device 102. The client computing device 102 can then make the determination as to whether the digital certificate 112 is trustworthy. The determination as to whether digital certificate 112 is trustworthy may include using a comparison algorithm to compare information contained in digital certificate 112 and the information contained in each of the additional digital certificates 116. As described above, the comparison algorithm, in one example, may include a set of instructions or rules that, when executed, compare the fields of each of the certificates. That is, each field from each of the digital certificates are checked to determine if they match. For a digital certificate to match another digital certificate, each individual field of the digital certificates need to match one another.

Moreover, as illustrated in FIG. 1, there may be a single endpoint 110. The endpoint 110 may be an end of a communication channel, represented as the Uniform Resource Locater (URL), of a computing resource. That is, in an embodiment, the endpoint 110 acts as an entry point to the computing resource and can be accessed via the HyperText Transfer Protocol (HTTP)/HTTPS protocol. In an embodiment, one or more endpoints may also be used to correspond to one or more computing resources hosted by a computer resource service provider. That is, computer resource service provider may contain more than one computing resource than that is illustrated in FIG. 1 and more than one endpoint may correspond to these additional computing resources. In some instances, each of the one or more endpoints may be different (e.g., if a website provider runs the website from multiple data centres around the world) but still refer to the same resource. The one or more resources may be any one of: a webpage, a network host, a virtual machine, or a virtual internet protocol (VIP) address that maps to a computing resource provided by a computer resource service provider.

Various techniques described and suggested herein provide efficient implementations and advantages through the use of serverless software (e.g., function, code, software containers). That is, as described herein, the serverless software may be executed by various providers on different platforms in each of the zones 114. Once executed, multiple requests may then be sent off from these different platforms to receive digital certificates. In other words, each of the zones 114 may be globally distributed and using different operating systems and the techniques described herein may be performed using serverless architecture. In an example, a software container (such as containers created by Docker) may be a lightweight, stand-alone, executable package of a piece of software. The software container may include code, runtime, system tools, system libraries, and settings. The software container can be executed on a variety of operating systems (e.g., Windows or Linux). When the software container is executed by a provider in one of the zones 114, multiple requests may be sent to the endpoint 110 such that digital certificates are received in return.

Figure 2:
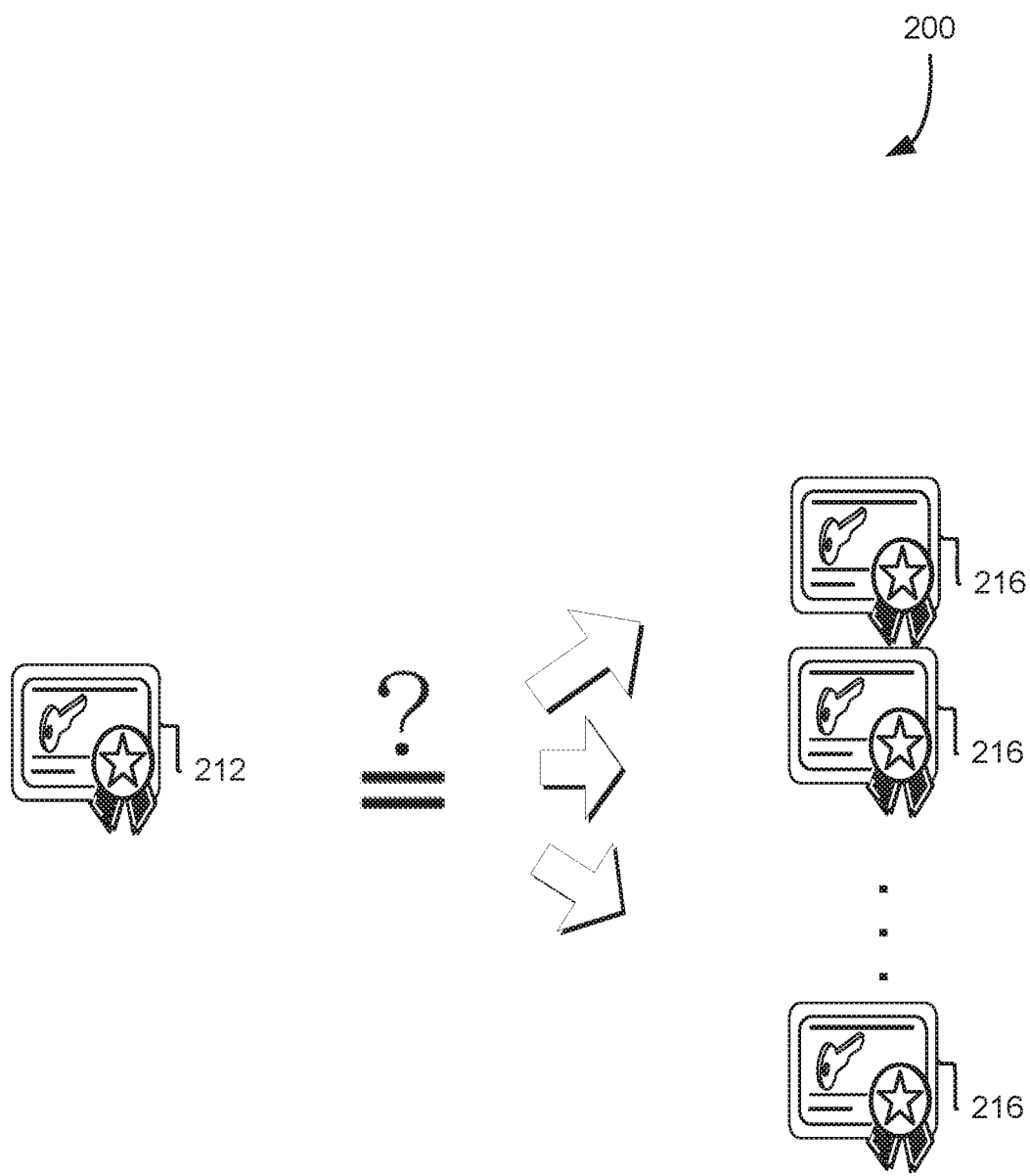
FIG. 2 illustrates a diagram for comparing digital certificates in accordance with an embodiment.

FIG. 2 illustrates a diagram 200 for comparing digital certificates. For example, in order for digital certificate 212 (received in response to the request 104 made by client computing device 102 as shown in FIG. 1) to be deemed trustworthy, all the plurality of additional digital certificates 216 are checked and analyzed to determine if the same information is contained in the digital certificate 212 as the information contained in each of the additional digital certificates 216. If the information in each of the additional digital certificates 216 are identical to the information contained in the digital certificate 212 then access to the resource may be provided. On the other hand, if the information in each of the additional digital certificates 216 are not identical to the information contained in the digital certificate 212 then a potential threat such as a man-in-the-middle (MitM) attack may have occurred. As a result, access to the resource may then be denied in response to the request 104.

That is, a determination may be made as to whether information contained in all of the additional digital certificates 216 received based on the additional requests match the information contained in the digital certificate 212. The determination may be performed using a comparison algorithm. As described above, the comparison algorithm may, as one example, include a set of instructions or code that, when executed, compares each of the fields contained in the digital certificates to determine if the fields match. In some instances, if information in a single additional digital certificate 216 out of the plurality of additional digital certificates 216 do not match the information contained in the digital certificate 212, then it may be determined that a MitM attack may have occurred and access to the resource may be denied. In some instances, when a single additional certificate 216 is determined to not match the digital certificate 212 but all the other remaining additional certificates 216 match the digital certificate 212, the system may elicit or cause another request to be sent from the same location again. That is, the same location may send another request and receive another additional digital certificate and determine whether this new additional digital certificate now contains the same information as the digital certificate 212. In other words, in some instances, the system may ask the location to launch a script again such that an additional certificate may be received again to determine whether the information contained therein matches the information contained in the digital certificate 212 before making a final determination as to whether the digital certificate 212 is trusted.

Further describing FIG. 2, in addition to assuring that the information contained in digital certificates 212, 216 matches identically, a threshold number (e.g., threshold value, quorum) pertaining to the amount of additional digital certificates may also be required. That is, the number of additional digital certificates 216 that are used to determine if information contained therein match the information contained digital certificate 212 may be predetermined. In one example, the threshold number may be set to three. Specifically, there has to be at least three additional digital certificates 216 that are identical to the information contained in the digital certificate 212 before determining that the digital certificate 212 is trusted. This threshold number may be altered or dynamically adjusted based on many different factors. As one example, the client computing device 102, based at least in part on user input, may predetermine the threshold number. In some instances, the threshold number may be adjusted to just one additional digital certificate 216 or two additional digital certificates 216 that contain information identical to the digital certificate 216. In another example, the threshold number may be any number greater than three.

In some instances, the more additional digital certificates 216 that the client computing device receives that contain the same identical information as the digital certificate 212, the more trustworthy the digital certificate 212 may appear to the client computing device to be. In other words, the amount of additional digital certificates 216 may be used to establish a trust score or confidentiality score to indicate how trustworthy the digital certificate 212 is deemed to be. For example, if ten additional digital certificates 216 are returned (instead of just three) and the information contained in each of them therein all matches the information contained in the digital certificate 212, then it may be determined with high probability or confidence that the digital certificate 212 is trustworthy.

Figure 3:
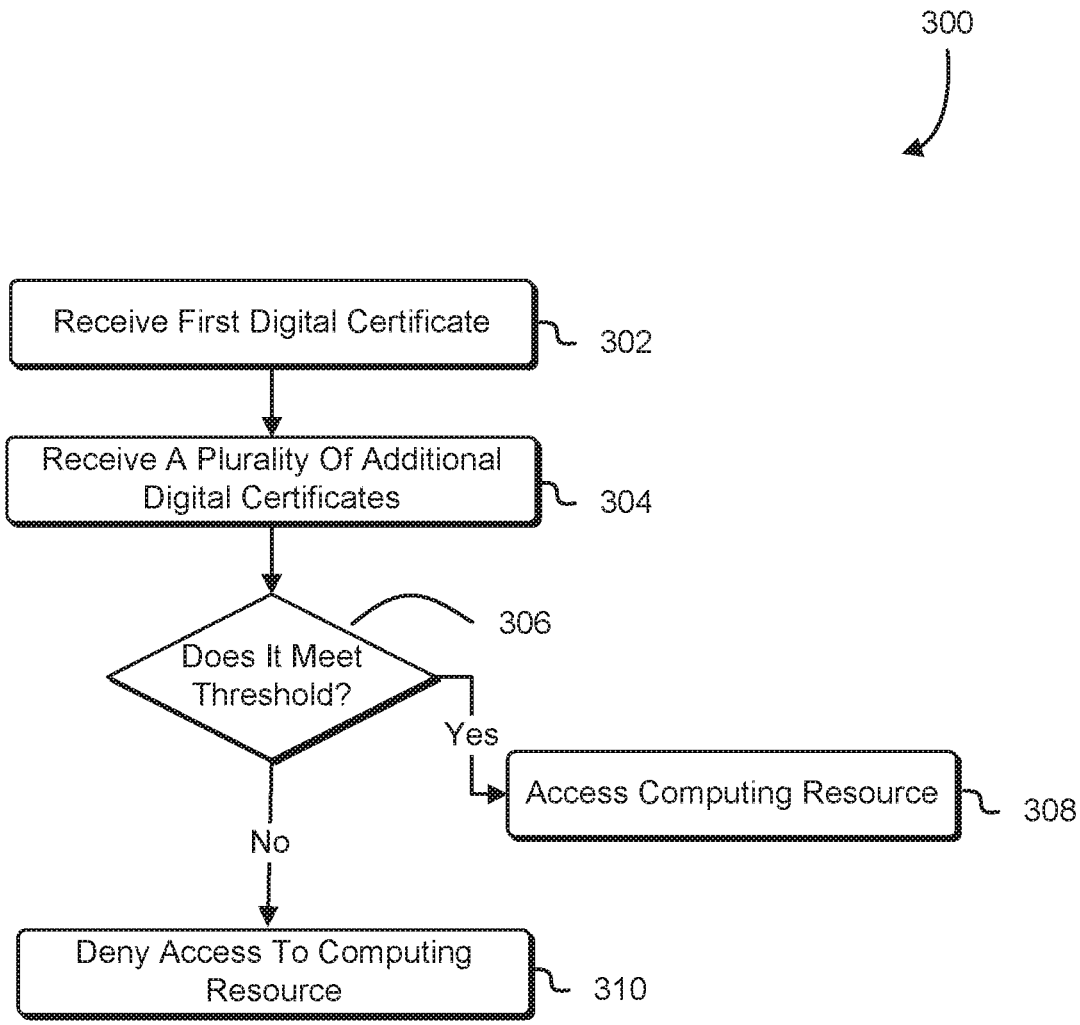
FIG. 3 illustrates a process for determining whether a digital certificate is trustworthy based on a threshold in accordance with an embodiment.

FIG. 3 illustrates a process 300 where the client computing device determines whether a digital certificate is trustworthy based on a threshold in accordance with an embodiment. As described above with respect to FIG. 2, in an example, the threshold number may be set to three. Specifically, in 302, for example, a first digital certificate is received in response to a request sent by a client computing device for access to a resource. Simultaneously, in 304, additional requests are sent on behalf of a plurality of computing devices located in different locations (e.g., zones). As a result of the plurality of requests, digital certificates are received. Once it is determined that the information contained in the first digital certificate is identical to the information contained in each of the additional digital certificates, the amount of the additional digital certificates are compared to the threshold number. For example, if the threshold number is three and each of the three additional digital certificates received match the first digital certificate then this threshold requirement may be met. If so, and as described in 306, access to the resource may be provided. If not, and as described in 310, access to the resource may be denied all together. In the alternative, and in some instances, access to the resource may also be provided but with restrictions. In yet another example, the threshold number may be less than a majority, a super majority, or the threshold number could be unanimity. In an instance, the threshold number may be just one. That is, one match is enough to meet the threshold. Moreover, in some instances, certain domain names or requests for resource may require higher threshold numbers than others. For example, if the resource is related to a bank or a banking site, the threshold number may be set higher than if the resource is related to a movie web site, where security may be less important than that pertaining to a banking site.

Figure 4:
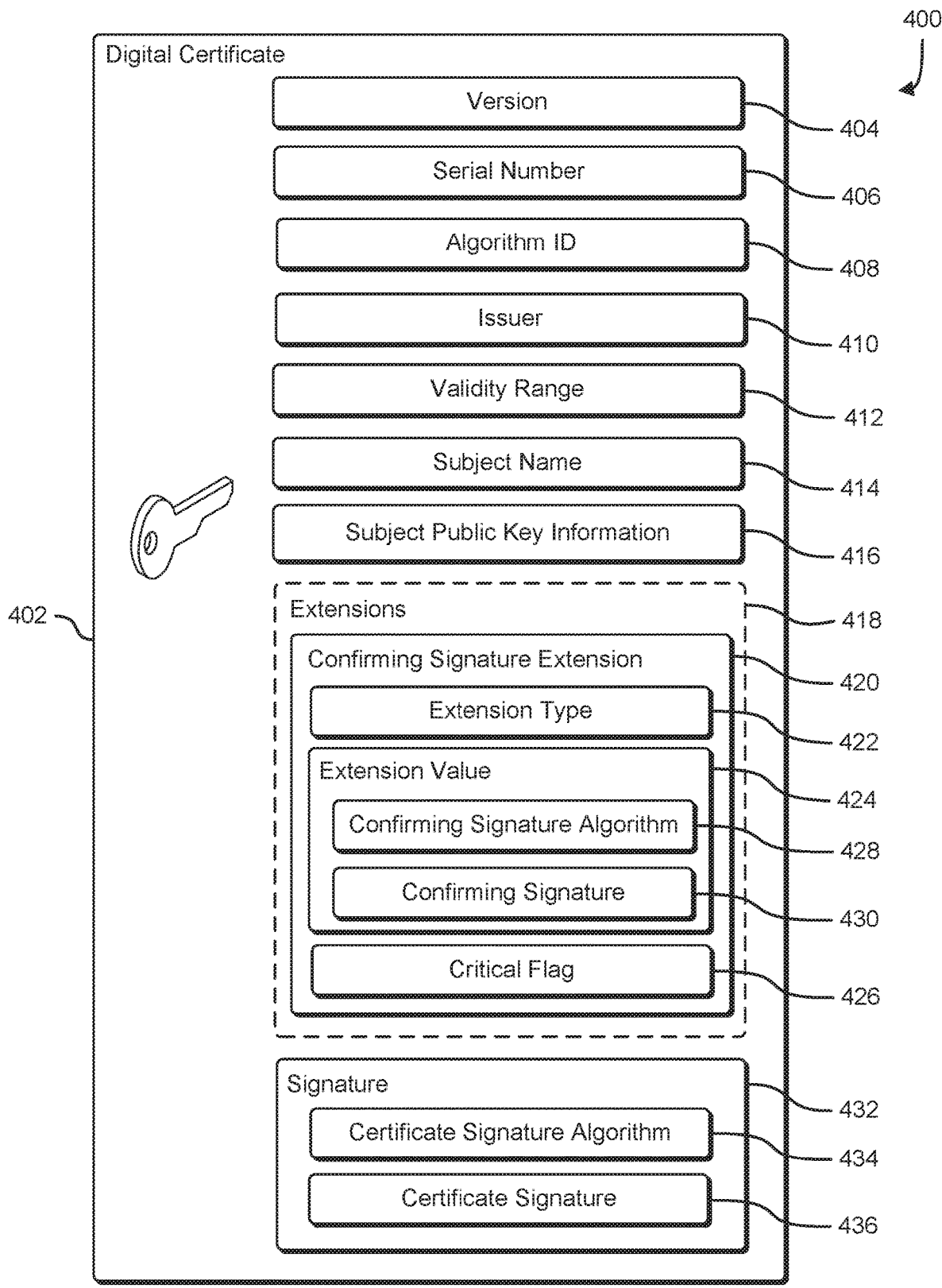
FIG. 4 shows a digital certificate in accordance with an embodiment.

FIG. 4 shows a digital certificate in accordance with an embodiment. A diagram 400 illustrates the structure of a digital certificate 402, such as an X.509 digital certificate. The structure of an X.509 digital certificate is described in RFC 5280 which is hereby incorporated by reference. The digital certificate 402 includes a version field 404, a serial number field 406, an algorithm ID field 408, an issuer field 410, a validity range 412, a subject name 414, and subject public key information 416. The version field 404 describes the version of the structure of the digital certificate 402. For example, for an X.509 certificate the version field 404 can specify a version of 3 when extensions are used with the digital certificate 402. The serial number field 406 holds an identifier assigned by and issuing certificate authority that is unique to each issued certificate. An algorithm ID field 408 contains an algorithm identifier that specifies an algorithm that is used by the certificate authority to sign the digital certificate 402. Various signature algorithms are specified in RFC 3279, RFC 4055, and RFC 4491, which are herein incorporated by reference, but other signature algorithms may also be specified. The issuer field 410 identifies the entity that has signed an issued the digital certificate 402. The validity range 412 specifies a range of time for which the digital certificate 402 is valid. In one example, the validity range 412 specifies a beginning time and date, and an expiration time and date. The subject name 414 identifies the entity associated with the public key identified in the subject public key information 416.

In various examples, the digital certificate 402 may also include one or more optional extensions. In one example, a list of extensions 418 includes a confirming signature extension 420. The confirming signature extension includes an extension type 422, an extension value 424, and a critical flag 426. The extension type 422 contains an identifier that identifies the confirming signature extension 420 as a confirming-signature-type of extension. The critical flag 426 specifies whether the confirming signature extension 420 must be implemented by a recipient of the digital certificate 402. For the confirming signature extension 420, the critical flag 426 may be false if the owner of the digital certificate 402 does not require a recipient to confirm the authenticity of the digital certificate 402 with the information contained in the confirming signature extension 420. If the owner of the digital certificate 402 requires a recipient to confirm the authenticity of the digital certificate 402 using the information contained in the confirming signature extension 420, the critical flag 426 may be set to true. The extension value 424 includes a confirming signature algorithm 428 and a confirming signature 430. The confirming signature algorithm 428 identifies a signature algorithm used to generate the confirming signature 430. The confirming signature algorithm 428 may be an algorithm specified in specified in RFC 3279, RFC 4055, RFC 4491, or other cryptographic signature algorithm. The confirming signature 430 holds a digital signature generated using a key associated with a previous version of the digital certificate 402.

The digital certificate 402 includes a set of signature fields 432 where the set of signature fields 432 indicates a certificate signature algorithm 434 and a certificate signature 436 which may be a digital signature generated based at least in part on data in the digital certificate 402 by a certificate authority. An indicator of a certificate signature algorithm 434 in the set of signature fields 432 indicates an algorithm used to generate the certificate signature 436. The algorithm may be an algorithm specified in RFC 3279, RFC 4055, RFC 4491, or other cryptographic signature algorithm. As described above, the set of signature fields 432 may be used as input to a comparison algorithm to determine whether any two digital certificates are identical to one another. The comparison algorithm may include a set of instructions or code that, when executed, make a determination as to whether the set of signature fields 432 in one digital certificate match another set of signature fields 432 in a second digital certificate.

Figure 5:
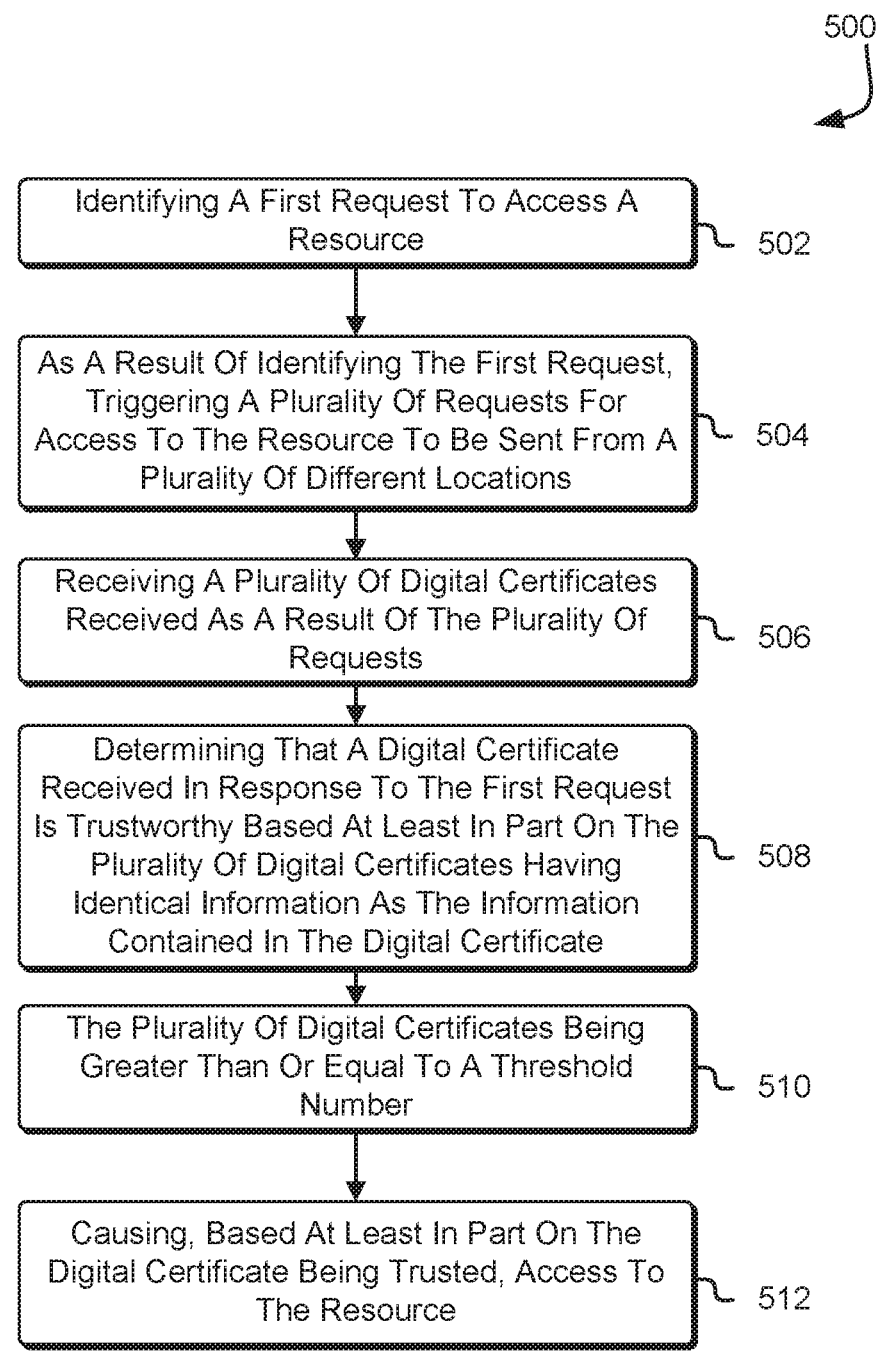
FIG. 5 illustrates a process for receiving multiple digital certificates in response to requests sent from different geographical locations and determining whether a digital certificate is trustworthy in accordance with an embodiment.

FIG. 5 illustrates a process 500 where a client computing device receives multiple digital certificates in response to requests sent from different geographical locations and determining whether a digital certificate is trustworthy in accordance with an embodiment. The process 500 may be performed by any suitable entity using hardware, software, or a combination thereof, such as at least some of the entities described in connection with FIGS. 1-4. That is, a client computing device may include a set of instructions, that when the set of instructions are executed, perform the operations as illustrated in process 500. In 502, in an embodiment, a first request (e.g., HTTPS connection request) from a client computing device intended for an endpoint to access a computing resource is identified. That is, the client computing device may directly send the HTTPS connection request, via a network, to the endpoint for access to a resource (e.g., computing resource). Simultaneously, when the first request is identified, the client computing device may cause multiple additional requests to be sent from a plurality of computing devices located in different locations to request access for the same computing resource via the same endpoint. The client computing device may be associated with one provider to send the HTTPS connection request, and the plurality of computing devices may be associated with either the same provider as the client computing device or different providers to send the multiple additional requests. That is, there may be multiple providers, using different platforms, but nevertheless each of the different providers may run the same code or the same set of instructions to send the requests for digital certificates. In some instances, the first request may be intercepted at a proxy. The proxy may be associated with a front end account that intercepts the requests from client computing device. The client computing device may have its SDK modified such that the client computing device believes that the proxy is the endpoint. In an embodiment, and as described in reference to FIG. 1, the endpoint-to-DNS lookup table can be changed for different types of programming languages.

In 504, the first request may be identified and as a result of the identification, additional requests for access to the same resource are also simultaneously sent from a plurality of different locations. This triggering event may be performed by the proxy, which in turn calls on one or more functions, to cause a plurality of different locations to send the plurality of requests. In some instances, a proxy may not be necessary, and the client computing device may cause a plurality of different locations to launch the functions to send the plurality of requests for access to the resource.

In 506, the client computing device receives the digital certificates as a result of the plurality of requests that were made. Each of the plurality of digital certificates contain information that are used to determine whether it matches the information contained in the digital certificate received in response to the first request. In some instances, each of the plurality of digital certificates are known to be valid certificates because they were previously provided out-of-band and pinned by the application making the first request. As such, a local root of trust was previously formed. In some instances, fingerprints (representation of a digital certificate) or public keys are received as a result of the plurality of requests.

In 508, the client computing device determines whether the digital certificate received in response to the first request is trustworthy. The determination may be performed by a comparison algorithm. Specifically, information contained in the plurality of digital certificates are compared and analyzed against the information contained in the digital certificates. As mentioned above, the comparison algorithm may include instructions or a set of code that, when executed, hashes each certificate and compares the hashes, identifies fields for each certificate and compares the fields or some of the fields (e.g., signatures). In other words, the validity of a digital certificate (or fingerprint or public key) is based at least in part on the digital certificates (or fingerprints or public keys) obtained as a result of the plurality of requests.

In 508, as an example, the digital certificate is determined to be trustworthy when instructions are selected to execute based at least in part on determining whether digital certificates can be trusted. Specifically, a first set of instructions can be selected from a set of instructions that allow access to the resource if the digital certificate is deemed to be trustworthy. Moreover, a second set of instructions may be selected from the set of instructions that prevent access to the resource if the digital certificate is deemed to be not trustworthy.

Moreover, in 510, the client computing device may determine that the information contained in the digital certificates match. However, an additional requirement may be that at least a threshold number of additional digital certificate are also met before deeming the digital certificate to be trustworthy. That is, in an effort to meet or exceed the predetermined threshold number of three, for instance, each of the three digital certificates obtained from the different locations must include information that match the first digital certificate before deeming the first digital certificate to be trustworthy. Specifically, for example, a first digital certificate is received in response to a request sent by a client computing device for access to a resource. Simultaneously, additional requests are sent on behalf of a plurality of computing devices located in different locations (e.g., zones). As a result of the plurality of requests, additional digital certificates are received. Once it is determined that the information contained in the first digital certificate is identical to the information contained in each of the additional digital certificates, the amount of the additional digital certificates are compared to a threshold number. So, if the threshold number is three and each of the three additional digital certificates match the first digital certificate then this threshold requirement may be met.

In response to the digital certificate being trusted, in 512, the client computing device is provided access to the resource. That is, the system may operate in accordance with whether the digital certificate (or fingerprint or public key) is verified as valid. In some instances, access to the resource (e.g., webpage) may be provided such that changes and inputs can be made. For example, if the digital certificate is deemed trustworthy such that access to the webpage is provided, then input and usage of the website may not have any restrictions. On the other hand, if the digital certificate were deemed to be not trustworthy then access to the webpage may contain restrictions. For example, the webpage may not allow input or changes. That is, the webpage may be in a view-only mode. In yet another example, if the digital certificate is not trustworthy, complete denial of access to the resource may also be provided.

Figure 6:
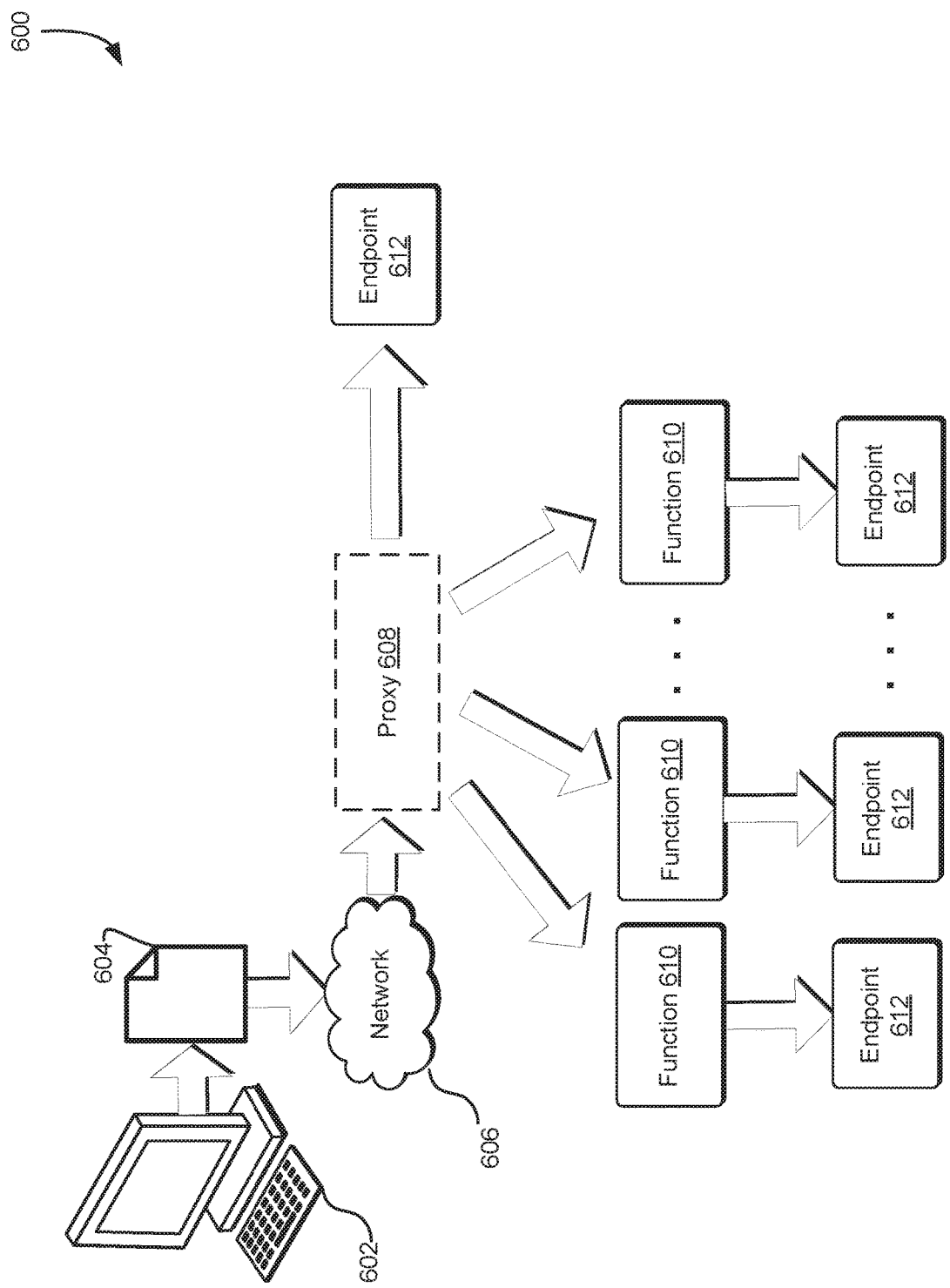
FIG. 6 illustrates a diagram that utilizes multiple functions to send additional requests for additional digital certificates in accordance with an embodiment.

FIG. 6 illustrates a diagram 600 that utilizes multiple functions to send additional requests for digital certificates in accordance with an embodiment. That is, a proxy 608, with the ability to call on multiple functions (e.g. light weight containerized scripts) 610, may receive the first request 604 generated from client computing device 602. Based on the first request 604 for access to endpoint 612, a digital certificate is returned. Simultaneously, the proxy may cause multiple functions (e.g. light weight containerized scripts) 610 to send a plurality of additional requests from computing devices of different geographical locations. The proxy 608 may be a separate device from the client computing device 602 or a service implemented by a server, a separate computing device, or a cluster of computing devices. In an example, the proxy service may be called upon as executable code, and if executed, to intercept requests from client computing devices via network 606. The proxy service may then perform one or more actions, using the resources of the server, to the intercepted requests prior to connecting the client computing devices to an endpoint 612, other services, and/or websites. As noted above, the client computing device 602 may run instructions or code using JAVA™, Python™, Node.js®, C++, Ruby, Hypertext Preprocessor (PHP), and/or other programming languages to connect to this proxy.

The multiple functions 610 (e.g. light weight containerized scripts), may be triggered so different geographical locations (e.g., zones) may send additional requests. For example, each of the zones (as illustrated in FIG. 1) may first be identified before requiring computing devices in the zones to send the additional requests. Once a zone (or multiple zones) has been identified, a function (e.g., lightweight containerized script) for a computing device in each identified zone may be launched to request the same endpoint 612. In response to these requests from different zones, a plurality of digital certificates may be returned. The plurality of digital certificates may be returned back to each of the multiple functions (e.g. light weight containerized scripts) 610 and the multiple functions (e.g. light weight containerized scripts) 610 may forward the additional digital certificates back to the client computing device 602. The client computing device 602 can then make a determination whether the digital certificate is trustworthy. In some instances, the digital certificate and the plurality of digital certificate may be analysed, at the proxy 608, to determine whether the digital certificate is trustworthy. Nevertheless, the determination as to whether digital certificate trustworthy may include using a comparison algorithm to compare information contained in digital certificate and the information contained in each of the additional digital certificates. That is, as described above, in one example, the comparison algorithm may include instructions that, when executed, identifies the signatures of the each of the digital certificates and compares them.

Figure 7:
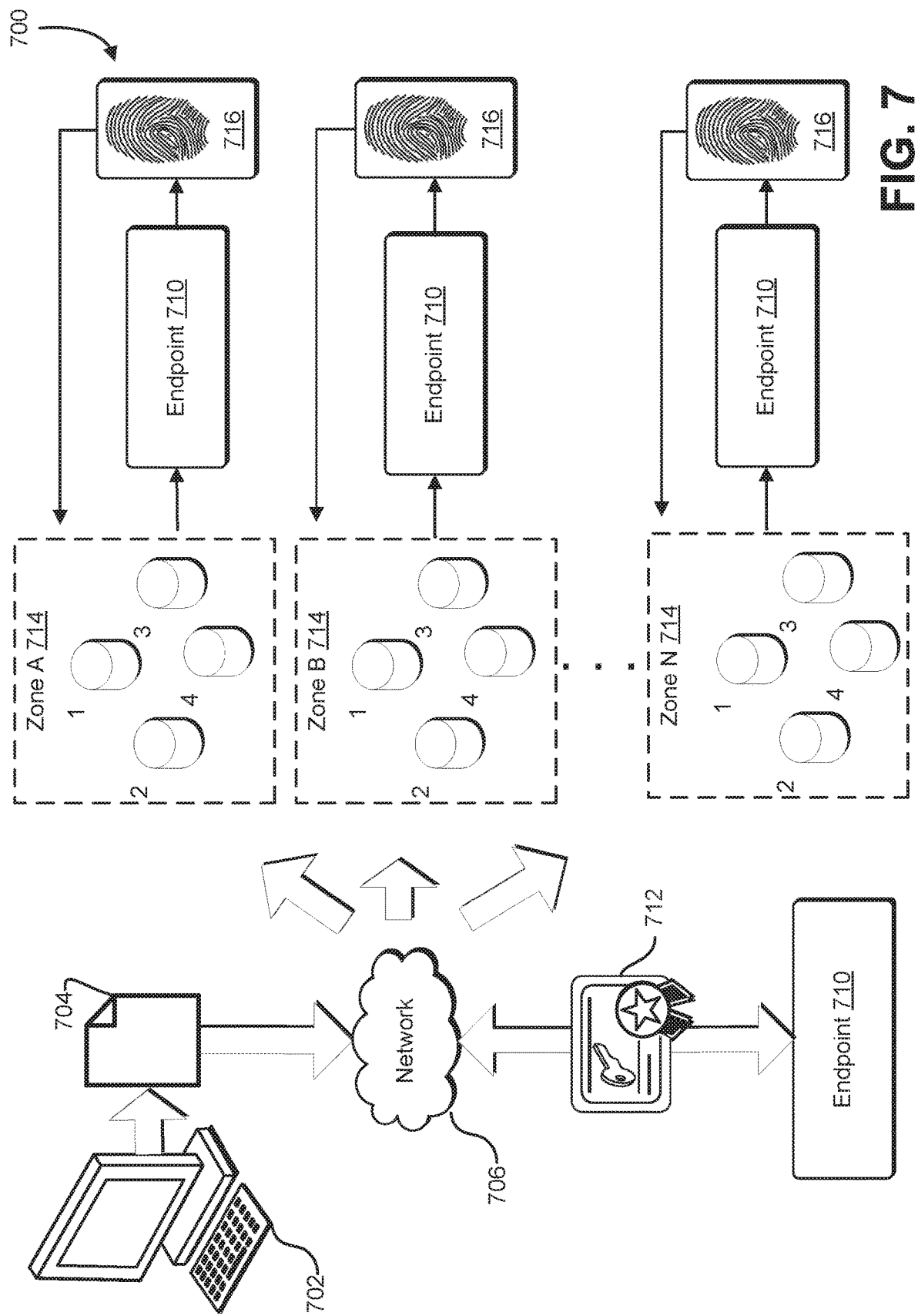
FIG. 7 illustrates a system in which one embodiment of comparing multiple fingerprints associated with a plurality of requests for access to a resource may be practiced.

FIG. 7 illustrates a system 700 in which one embodiment of comparing multiple fingerprints associated with a plurality of requests for access to a resource may be practiced. Similar to the description described above with respect to FIG. 1, system 700 illustrates one embodiment where a digital certificate 712 and additional fingerprints 716 are received instead of all digital certificates 112, 116 (as shown and described with respect to FIG. 1).

That is, once a request 704 for access to a resource through endpoint 710 from a client computing device 702 is identified, a plurality of requests for access to the same resource may simultaneously be sent from a plurality of different locations (e.g., zones) 714. Specifically, via the network 706, additional requests may be launched by different computing devices located in different zones 714. For example, when request 704 is identified, parallel messages to a number of geographically distributed locations to launch a light-weight, containerized script that requests the same endpoint 710 for the resource are also made. In response to the additional requests, a plurality of fingerprints 716 are received and then further compared to the fingerprint of digital certificate 712 received in response to the request 704. In some instances, in response to the additional requests, some may return fingerprints 716 and some may return digital certificates. That is, the responses to the additional requests may include a combination of fingerprints 716 and/or digital certificates.

Generally, a fingerprint 716 is a representation that uniquely identifies the original data. That is, by using a fingerprint algorithm, the algorithm may map an arbitrary large file (e.g., digital certificate) to a much shorter bit string. For example, the fingerprint algorithm may consist of a set of instructions or code that, when executed by a computing device, hashes information (e.g., a signature field) in a digital certificate to generate a hash value. The generated hash value would be considered the fingerprint of the digital certificate and this value is then compared to the other fingerprints (e.g., hash values) of other digital certificates.

In one example as illustrated in FIG. 7, the client computing device 702 receives the fingerprints 716. The client computing device 702 may then determine based on the fingerprints 716 whether the fingerprints 716 are identical to the fingerprint of digital certificate 712. That is, the client computing device 702 may execute a set of instructions or code to compare the information contained in the fingerprints. As one example and as described above, the set of instructions or code may be a comparison algorithm that, when executed, compares the hash values of the fingerprint of digital certificate 712 with each of the fingerprints 716. Based on the results of the comparison, client computing device 702 may then be provided with access to the resource or denied access to the resource. By using fingerprints 716 (representing a portion of a digital certificate for example), it may be advantageous such that computing resources and computations may be saved since only a portion of a digital certificate needs to compared with one another and not the entire digital certificate itself.

Figure 8:
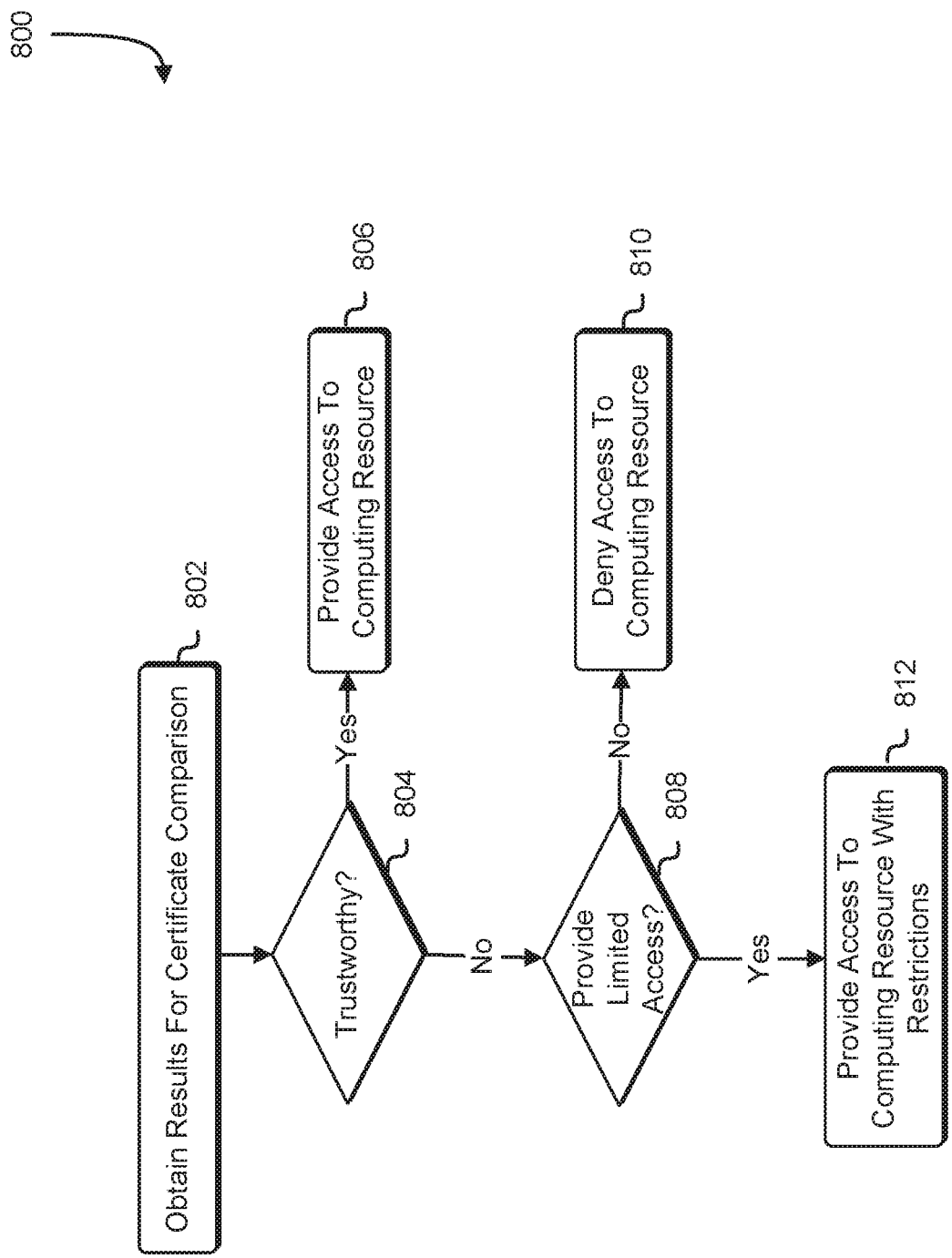
FIG. 8 illustrates a process for performing operations based at least in part on whether a digital certificate is trustworthy in accordance with an embodiment.

FIG. 8 illustrates, in accordance with an embodiment, the client computing device performing operations to execute process 800 that determines whether a digital certificate, returned in response to a request for access a resource, is trustworthy and further performs certain operations based on the determination. In 802, the client computing device may obtain results for certificate comparison. In some instances, the determination of whether a digital certificate is trustworthy may be performed by a separate computing device other than the client computing device. In other words, the determination can be made at a separate device or proxy associated with the client computing device. The digital certificates may be sent to this proxy or separate device and the determination can be made before submitting the result of the determination back to the client computing device.

In 804, the client computing device determines whether a digital certificate is trustworthy. Based on this this, in 806, access to the computing resource or resource may be provided without restrictions if the digital certificate is deemed to be trustworthy. As noted above, the resource may be a host or a webpage. Thus, the client computing device may be provided with access to the website when it is determination that the digital certificate received is deemed trustworthy.

In 808, if the client computing device determines that the digital certificate is not trustworthy, then the client computing device may be provided with limited access to the resource or no access to the resource at all. For example, at 812, the client computing device may be provided access to the resource with restrictions. As noted above, the computing resource or resource may also be a host or a webpage. Thus, the client computing device may be provided with certain access restrictions to the website when it is determination that the digital certificate received is not trustworthy. For instance, the webpage may only provide images of the website to be displayed but does not allow input from a client computing device. However, in the alternative, at 810, the client computing device may be provided with no access to the resource. That is, access to the computing resource may be denied completely.

Figure 9:
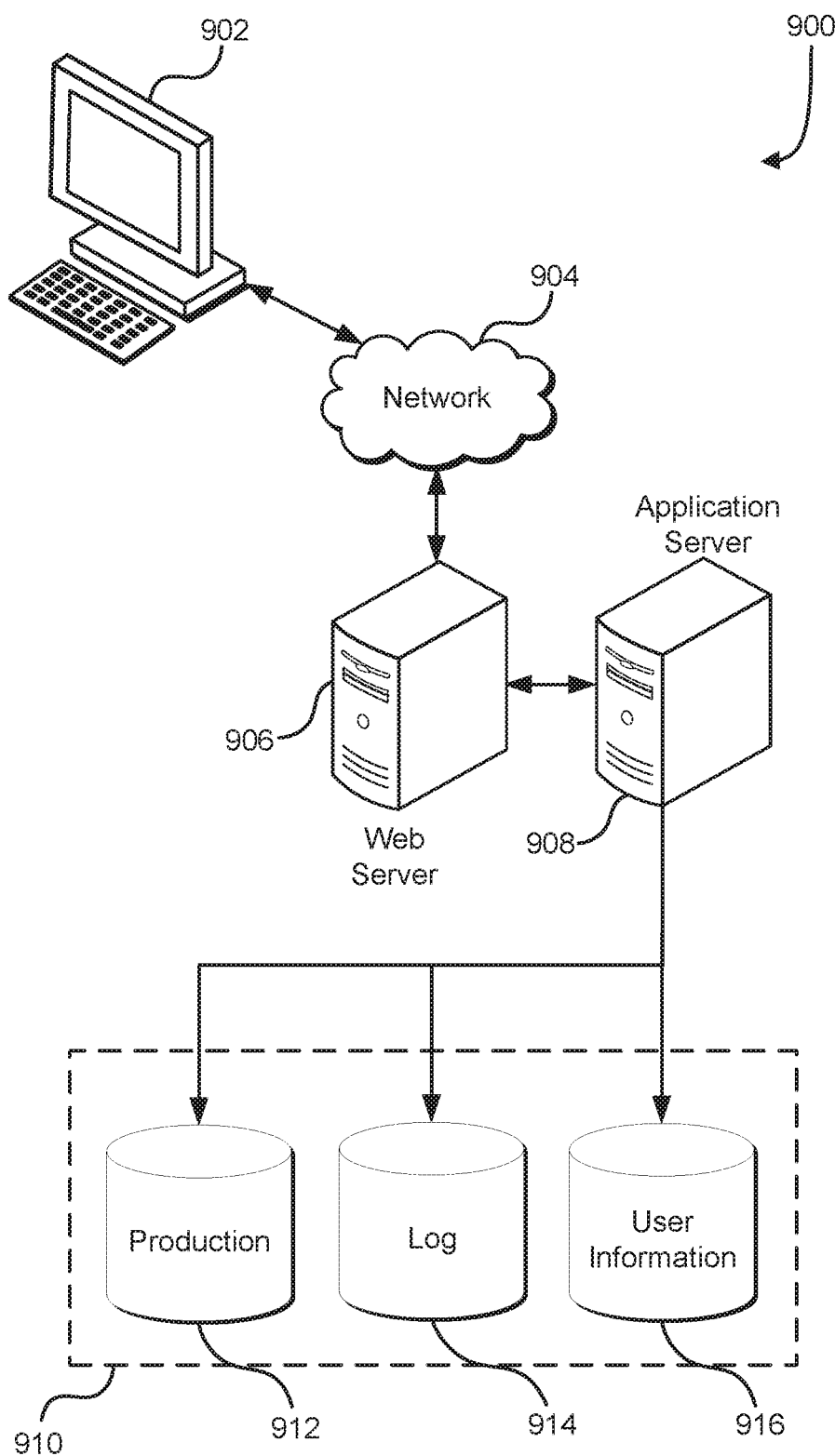
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices, or processing devices that can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dumb terminals, thin-clients, gaming systems, and other devices capable of communicating via a network. These devices also can include virtual devices such as virtual machines, hypervisors, and other virtual devices capable of communicating via a network.

Various embodiments of the present disclosure utilize a network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network 904 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as My SQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for distributed endpoint authentication, comprising:
    identifying a first request to access a resource being sent from a computing device at a first location to an endpoint;
    in response to identifying the first request, triggering a plurality of requests for access to the same resource to be sent from a plurality of different locations to the same endpoint;
    receiving a plurality of digital certificates in response to the plurality of requests;
    determining that a digital certificate received in response to the first request is trustworthy based at least in part on the received plurality of digital certificates having identical information as the information contained in the received digital certificate associated with the first request, wherein the received plurality of digital certificates being greater than or equal to a predetermined threshold number; and
    causing, based at least in part on the received digital certificate associated with the first request being trusted, access to the requested resource.

2. The computer-implemented method of claim 1, wherein the first request is a HyperText Transfer Protocol Secure (HTTPS) connection request for access to the resource and the plurality of requests for access to the resource to be sent from the plurality of different locations are new HTTPS connection requests for access to the resource.

3. The computer-implemented method of claim 1, further comprising:
    identifying a second request to access a resource;
    as a result of identifying the second request, triggering a second set of plurality of requests for access to the resource to be sent from the plurality of different locations;
    determining that a second set of digital certificates received as a result of the second set of plurality of requests do not meet the threshold number; and
    denying, based at least in part on the determination, access to the resource.

4. The computer-implemented method of claim 1, wherein the different locations sending the plurality of requests are geographically distributed locations, wherein individual geographical locations of the geographically distributed locations launch respective containerized script to request access to the resource.

5. A system, comprising at least one computing device configured to implement one or more services for distributed endpoint authentication, wherein the one or more services:
    trigger a plurality of requests for access to a resource to be sent from a plurality of different locations to an endpoint in response to a first request being sent from a first location to the same endpoint for access to the same resource;
    verify validity of a public key by comparing the public key with a plurality of pubic keys obtained from digital certificates received respectively from the first location and different locations in response to the first request and the plurality of requests; and
    operate in accordance with whether the public key is verified as valid for access to the requested resource based at least in part on the plurality of public keys having identical information as the public key associated with the first request and the first location.

6. The system of claim 5, wherein the one or more services of the system verifies validity of the public key by at least determining whether information associated with the public keys obtained as a result of the plurality of requests matches information associated with the public key.

7. The system of claim 6, wherein the one or more services of the system operate in accordance with whether the public key is verified as valid by at least denying access to the resource if the information associated with the public keys obtained as a result of the plurality of requests do not match the information associated with the public key.

8. The system of claim 6, wherein the one or more services of the system operate in accordance with whether the public key is verified as valid by at least providing access to the resource with restrictions if the information associated with the public keys obtained as a result of the plurality of requests do not match the information associated with the public key.

9. The system of claim 5, wherein the plurality of different locations are geographically distributed locations, wherein individual geographical locations of the geographically distributed locations launch respective containerized script to request the resource.

10. The system of claim 9, wherein public keys for individual geographical locations of the geographically distributed locations are pinned.

11. The system of claim 5, wherein the plurality of requests for access to the resource are sent from the plurality of different locations simultaneously.

12. The system of claim 5, wherein the resource is any one of: a network host, a computing device, a virtual machine, a webpage, or a virtual internet protocol address that maps to a computing resource provided by a computer resource service provider.

13. A non-transitory computer-readable storage medium having stored thereon executable instructions that, as a result of being executed by one or more hardware processors of a computer system to implement one or more services for distributed endpoint authentication, cause the computer system to at least:

trigger a plurality of requests for access to a resource to be sent from a plurality of different locations to an endpoint in response to a first request being sent from a first location to the same endpoint for access to the same resource;

verify validity of a public key by comparing the public key with a plurality of public keys obtained from digital certificates received respectively from the first location and different locations in response to the first request and the plurality of requests; and operate in accordance with whether the public key is verified as valid for access to the requested resource based at least in part on the plurality of public keys having identical information as the public key associated with the first request and the first location.

14. The non-transitory computer-readable storage medium of claim 13, wherein the instructions further comprise instructions that, as a result of being executed by the one or more processors, cause the computer system to determine whether information about the plurality of public keys obtained as a result of the plurality of requests for the same resource submitted from different locations matches information about the public key.

15. The non-transitory computer-readable storage medium of claim 14, wherein the instructions further comprise instructions that, as a result of being executed by the one or more processors, cause the computer system to deny access to the resource if the information about the plurality of public keys obtained as a result of the plurality of requests for the same resource submitted from different locations do not match the information about the public key.

16. The non-transitory computer-readable storage medium of claim 14, wherein the instructions that, as a result of being executed by the one or more processors, cause the computer system to provide access with restrictions to the resource if the information about the plurality of public keys obtained as a result of the plurality of requests for the same resource submitted from different locations do not match the information about the public key.

17. The non-transitory computer-readable storage medium of claim 13, wherein the different locations are geographically distributed locations, wherein individual geographical locations of the geographically distributed locations launch respective containerized script to request the same resource.

18. The non-transitory computer-readable storage medium of claim 17, wherein public keys for individual geographical locations of the geographically distributed locations are pinned.

19. The non-transitory computer-readable storage medium of claim 13, wherein the plurality of requests for the same resource submitted from different locations are sent simultaneously.

20. The non-transitory computer-readable storage medium of claim 13, wherein the resource is any one of: a network host, a computing device, a virtual machine, a webpage, or a virtual internet protocol address that maps to a computing resource provided by a computer resource service provider.

* * * * *